Figure 5:
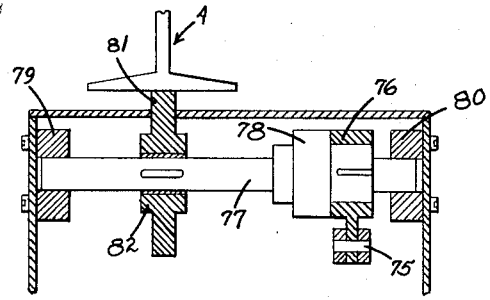

Dec. 13, 1955    T. TSCHUDI    2,726,618
APPARATUS FOR THE PRODUCTION OF LAMINATED STRUCTURES
Filed Sept. 12, 1952    2 Sheets-Sheet 1

INVENTOR.
TRAUGOTT TSCHUDI
BY
Thomas B. O'Nally
ATTORNEY

Dec. 13, 1955  T. TSCHUDI  2,726,618
APPARATUS FOR THE PRODUCTION OF LAMINATED STRUCTURES
Filed Sept. 12, 1952  2 Sheets-Sheet 2

INVENTOR.
TRAUGOTT TSCHUDI
BY
Thomas B. O'Malley
ATTORNEY

United States Patent Office 2,726,618
Patented Dec. 13, 1955

2,726,618

APPARATUS FOR THE PRODUCTION OF LAMINATED STRUCTURES

Traugott Tschudi, Flushing, N. Y., assignor to American Viscose Corporation, Philadelphia, Pa., a corporation of Delaware Application September 12, 1952, Serial No. 309,247

7 Claims. (Cl. 113—59)

The present invention relates to an improved machine for bonding or cladding structural units, particularly large and heavy tanks or vessels. The term bonding as used herein is intended to cover generically the joining of two pieces of material by the application of a fusible material in the manner of the processes generally referred to as welding and lead burning, as well as to the building up of a coating of the fusible metal upon the surface of another material, especially another metal, as in cladding.

In the prior art systems for cladding base plates or other members by welding procedures wherein the low-melting metal is applied to a relatively high-melting or infusible material, it has been the rule to supply the lower melting point material in the form of a rod or wire, or to carry it within a special container which maintains it in the molten state whereby the rod or the molten material may be fed continuously or intermittently to a point of application on the surface of the base member. In accomplishing the transition from manual cladding methods to automatic mechanical systems for building homogeneous welded metallic laminated structures, it has been necessary to provide apparatus in such systems for storing and forwarding the applied material. Needless to say, feeding and storing apparatus greatly complicates the structure of a mechanical cladding machine, and furthermore considerable care is necessary on the part of the operator to maintain good operating adjustments with regard, for example, to the rate of relative travel between the cladding unit and the work, the rate of feeding the fusible material, and the intensity of the heat applied to the work.

Figure 1:
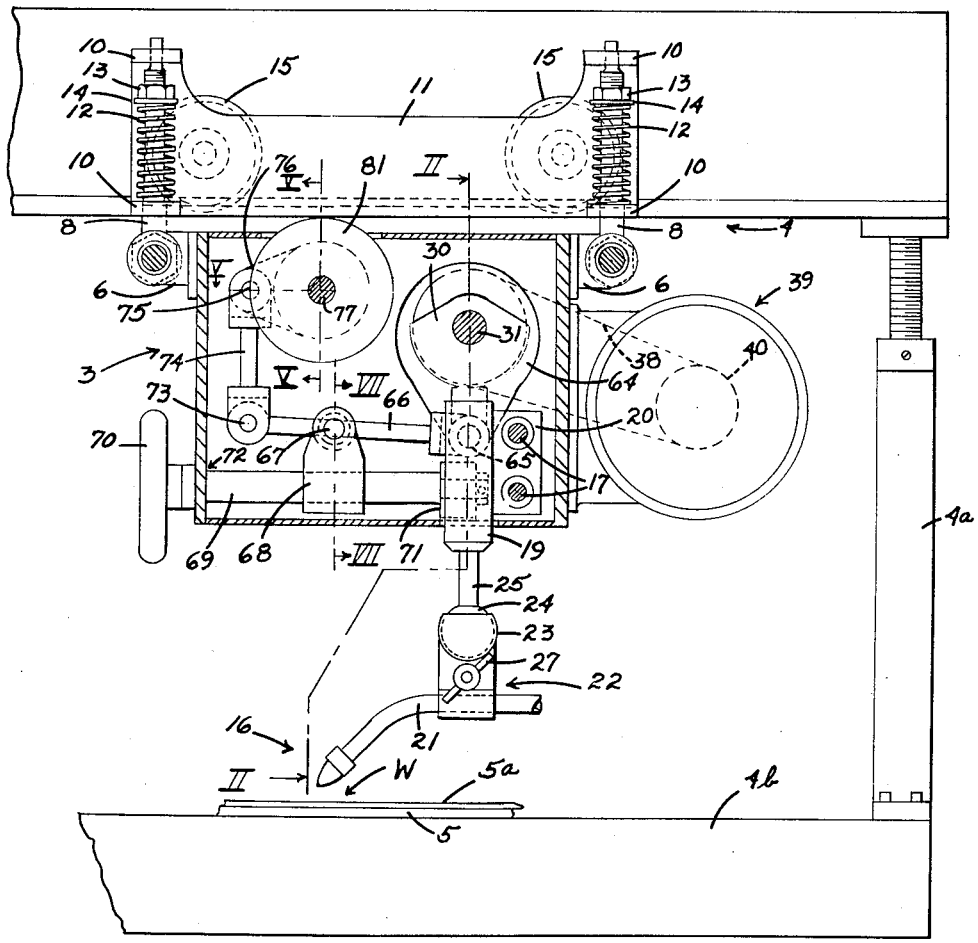
Figure 3:
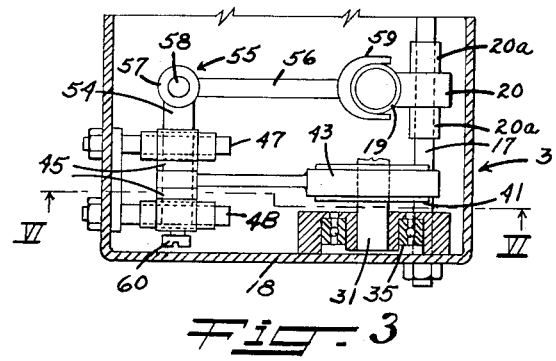
Figure 6:
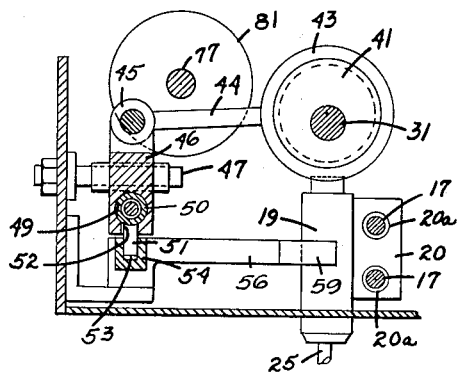
Figure 7:
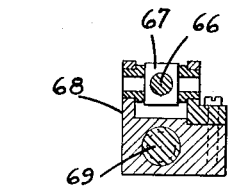
Figure 2:
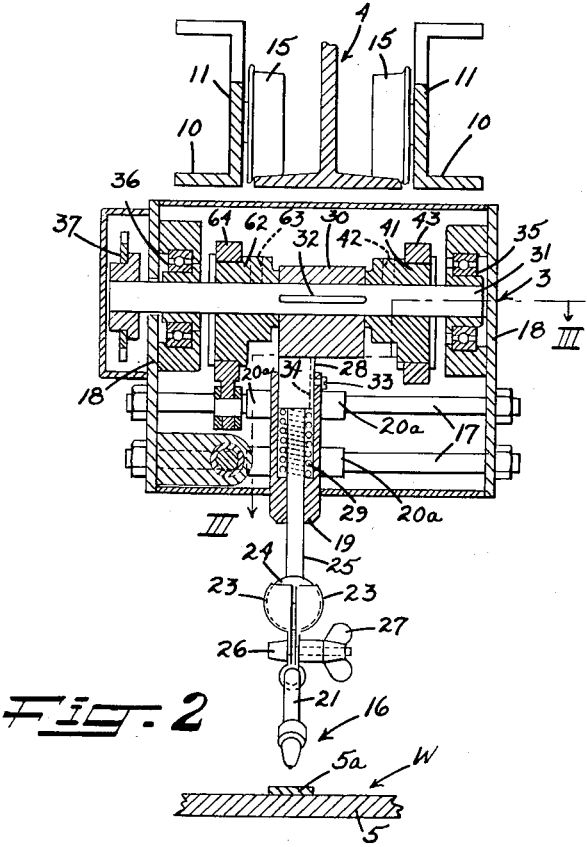
Figure 4:
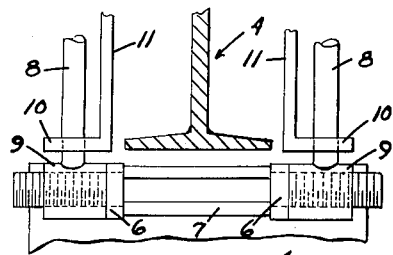

It is an object of the invention to provide a compact bonding machine which is particularly adapted to be automatically moved along the work to be bonded. Another object is to provide a bonding machine adaptable to the bonding of a fusible material to a base plate or surface which is adapted to effect the bonding of a strip of the fusible material previously deposited on the base to be clad so that the machine need not carry a supply of the fusible material or the driving means necessary to properly feed such material to the position adjacent the torch. Other objects, features and advantages will become apparent from the following description of the invention and the drawing relating thereto in which:

Figure 1 is a side elevation showing the general arrangement of the machine and a work-piece with the carrier housing and certain other parts in section, Figure 2 is a section on line II—II of Figure 1, Figure 3 is a section on line III—III of Figure 2, Figure 4 is a partial end view showing a detail of the mounting for the housing, Figure 5 is a section on line V—V of Figure 1, Figure 6 is a section on line VI—VI of Figure 3, and Figure 7 is a section on line VII—VII in Figure 1.

In accordance with the present invention, there is provided a bonding machine, characterized by a member for supporting a work-piece, a carrier, means for imparting relative movement between the work-piece and the carrier in intermittent steps, a torch support carried by the carrier, means for reciprocating the support relative to the carrier in a generally horizontal direction transverse to the direction of relative motion between the carrier and the work-piece, a torch on the support, and means for reciprocating the torch vertically.

Although the machine of the invention is widely applicable to operation upon numerous combinations of materials having sufficient differences in melting point temperatures to enable the deposition of one material in the molten state onto another with which it forms a bonded interface, the machine is presently primarily applicable to the manufacturing of lead-lined vessels for the chemical industries and is therefore described with respect to the cladding of steel plates or other steel base members with lead.

The drawing shows a mobile bonding machine comprising a carrier or housing 3 supported on a supporting member 4 which may extend longitudinally and generally horizontally above the work-piece W. The member 4 may take the form of an I beam and may be supported at each end by suitable vertically adjustable posts 4a secured to the floor, table or platform 4b which in turn supports the work W. Work-piece W may comprise a base plate 5 adapted to be bonded or clad and the superimposed strip 5a of fusible material; such as lead. The work-piece W may be supported on a suitable platform which may be adapted to be moved transversely of the direction of longitudinal extension of the member 4. The base 5 may be a flat or curved plate or the curved wall of a vessel of cylindrical or other shape.

Projecting from the top of the housing 3 and at each end thereof, there is provided a pair of brackets 6. A double-ended bolt having a shank 7 of hexagonal cross-section and threads of opposite hand at its two ends projects through suitable bores in each pair of the brackets 6. Bolts 8 have transverse cylindrical heads 9 which threadedly engage the threads on the double-ended bolts. The shanks of bolts 8 extend upwardly through bores or slots in the laterally projecting lugs 10 on the frame plate 11. Each bolt 8 is surrounded by a spring 12, a nut 13 and a washer 14 so that in effect the carrier 3 rests upon the four springs 12 which in turn rest upon the lower lugs 10 on the two carriage frames 11. Each of the two frames 11 is provided with a pair of wheels 15 which are adapted to ride upon the upper surface of the lower flange of the I-beam 4.

The housing 3 contains the mechanism hereinafter more particularly described for imparting the proper motion to the torch or burner 16 and the proper relative motion between the carrier 3 and the member 4.

*System for supporting the torch*

A pair of parallel rods or ways 17 extend between the opposite sidewalls 18 of the housing 3. A socket or receptacle 19 is fixedly or rigidly secured on a slide block 20 which is provided with two bores having a sliding fit about the rods 17 so that the block 20 may slide along the rods 17. The block 20 may be bossed at 20a to provide long bearing area of the block on the rods. The torch 16 comprises a tubular conduit 21 adapted to fit between suitably shaped portions of the two-sided clamp 22 which is provided with upper sockets 23 adapted to fit about the enlarged spherical end 24 of a piston rod 25. A bolt 26 and wing-nut 27 provide the necessary means for loosening or tightening the clamp in any desired position about the tube 21 and the sphere 24. The rod 25 is provided with an enlarged head 28 on its upper end and this head act as a plunger or piston. A spring 29 is received beneath the piston 28 within the receptacle 19. The spring 29 urges the piston 28 upwardly against a cam 30 which is keyed to the drive shaft 31 at 32. The set screw 33 may extend through the sidewall of receptacle 19 into a keyway 34 in the plunger 28 in order to prevent the rod 25 from rotating.

The drive shaft 31 is mounted within bearings 35 and 36 mounted on opposite walls 18 of the housing 3 and carries at one end a sprocket 37 which is driven by a chain 38 from a motor-reducer unit 39 by means of the sprocket 40. The motor-reducer unit is secured to one wall of the housing 3 so that it is carried by it.

The drive shaft 31 carries an eccentric 41 which is fixedly secured to the shaft by set screw 42. The eccentric strap 43 is rigidly secured to the rod 44 which is pivotally connected between a pair of ears or lugs 45 extending upwardly from a slide block 46 which is provided with two bores which slidingly fit upon the rods 47 and 48 projecting from one wall of the housing 3. The slide block 46 is provided with a bore 49 within which a sleeve 50 is axially slidable. The sleeve 50 is rigidly secured to a pin 51 which projects downwardly through a slot 52 in the bottom of the slide block 46 and into the slot 53 in an arm 54 of the bell crank lever or rocker arm 55 which comprises an arm 56 rigidly connected to the arm 54 through the bearing sleeve 57 which is rotatably mounted on a fixed upright pin or rod 58. The rocker arm 56 is provided with an open-ended yoke 59 which has a sliding fit around the socket or receptacle 19. A screw 60 extends through the sleeve 50 and threadedly engages an internal screw thread in the sleeve so as to permit the adjustment of the pin 51 axially within the slot of the slide block 46. This varies the throw of the rocker arm 56.

Driving mechanism

A cam or eccentric 62 is fixed on shaft 31 such as by a set screw 63 and the strap 64 carried thereon is pivotally connected at 65 to a link 66 which extends through a fulcrum bearing 67 rotatably mounted within a yoke 68. The yoke 68 is carried upon a screw 69 which is adapted to be rotated by the handle or wheel 70 positioned outside the housing 3. The screw 69 rotates within the fixed bearing 71 and within a bearing at 72 in one wall of the housing. Rotation of the wheel 70 moves the yoke 68 back and forth along the screw 69 and shifts the fulcrum block 67 so as to vary the relative throw between the opposite ends of the rods 66. As shown in Figure 7, the rod 66 extends slidably through a bore extending through the block 67 which is provided with trunnions which extend into suitable bearing openings in the upstanding ears of the yoke 68.

The other end of the rod 66 is pivotally connected at 73 to a link 74 which is pivotally connected at 75 to the ear of crank 76 connected to a shaft 77 through a one-way clutch 78 (see particularly Figure 5) so as to drive the shaft 77 on one stroke only of rod 66. The shaft 77 is supported in bearings 79 and 80 in the opposite walls 18 of the housing 3. A driving wheel or roll 81 is fixedly mounted on the shaft 77 and its periphery engages the support member 4.

Operation

In accordance with the present invention, the operator disposes a strip of the fusible material, such as a narrow strip of lead, upon the base sheet 5 which is to be clad or bonded, such as of steel. The operator then lights the torch and disposes the machine at the proper relative position such as at one end of the work-piece W which, as shown in Figure 3, may be a flat plate disposed on the floor or, if desired, on a suitable platform which may be automatically moved intermittently (between the bonding of each strip 5a) relative to the machine if desired such as in a horizontal direction at right angles to the direction of the movement of the machine along the work W. The machine can be shifted along the supporting member 4 to any desired starting position. When the attendant has thus properly positioned the machine relative to the work, he merely turns on the motor for which a suitable switch may be provided on the housing 3. The motor drives the cam 30 and the eccentrics 41 and 62. The cam 30 bears against the head 28 and reciprocates the rod 25 carrying the torch vertically. The eccentric 41 causes oscillation of the rocker arm and the reciprocation of the slide block 20 carrying the socket 19 which supports the torch carrying rod 25. This motion causes the torch to move back and forth transversely to the direction of longitudinal extension of the strip 5a of fusible material. Eccentric 62 causes intermittent driving of the wheel 81, thereby intermittently moving the housing or carrier 3 along the supporting member 4. The relative motions thus described may be summarized as follows: The burner while close to the work moves sidewise. The flame moves across the strip of fusible material and causes melting thereof. As the burner starts to move upwardly, the carrier starts to move relative to the work. During the period in which the burner moves away from and again approaches the work, the machine has been advanced a predetermined distance for the next melting operation, such as from about 3 to 12 mm. or ⅛ to ½ of an inch respectively. This advancement of the carrier 3 relative to the work is adjustable and depends upon the size of the flame from the torch, i. e. the amount of melting that it can effect in a given stroke. This cycle of operation is repeated indefinitely till the cladding is completed. While in the embodiment described, the machine moves relative to the work, if desired, the machine may be supported in fixed position such as by means of suitable pedestals secured to the housing 3 and the supporting member 4 may be movably mounted relative to the housing 3 such as by having the upper flanges of the I-beam rest upon the roller 15 and the work-piece may be fixedly suspended from the I-beam.

The material used for cladding may be preformed in flat or arcuate section, depending on whether the article to be clad is flat or curved, to approximately fit the surface of the base member to be clad. If desired, a single cylinder of the fusible material which substantially fits the entire surface to be clad may be used. If sections, strips or slabs are used instead of a single unit, a section, strip, or slab may be placed periodically along the surface of the base member against a section already properly positioned therein to keep the cladding apparatus in continuous operation.

I claim:

1. In lead-burning apparatus, a unitary movable carriage assembly comprising a housing, a motor secured to said housing, a driveshaft journaled in said housing, driving connections between the motor and the driveshaft, ways supported in the housing parallel to the driveshaft, a torch supporting assembly positioned on said ways for sliding horizontal movement thereon, a first eccentric keyed to said shaft, an oscillating arm pivoted in the housing and connected between the first eccentric and the torch supporting assembly by means of a rocker arm for reciprocating said assembly on the ways in accordance with the rotation of said first eccentric, a torch supporting plunger vertically reciprocable in said torch supporting assembly, a cam keyed to the shaft and positioned to reciprocate the plunger, a second eccentric keyed to the shaft, a driving member journaled in the housing for moving the entire carriage, a one-way clutch connected to said driving member, and a connecting link between said second eccentric and said one-way clutch to impart unidirectional movement to the driving member in accordance with the rotation of said second eccentric.

2. Apparatus in accordance with claim 1 having means for manually adjusting the throw of the connecting link between the second eccentric and the one-way clutch.

3. Apparatus in accordance with claim 1 having means for manually adjusting the throw of the oscillating arm connected to the torch-supporting assembly.

4. Apparatus in accordance with claim 1 in which the driving member is a wheel having a friction surface.

5. Apparatus in accordance with claim 1 having means for resiliently urging the driving member outwardly with respect to the carriage.

6. Apparatus in accordance with claim 1 in which the cam is provided with a wide face to maintain plunger actuation during horizontal reciprocation of the torch supporting assembly.

7. In lead-burning apparatus, a unitary movable carriage assembly comprising a housing, a motor secured to said housing, a driveshaft journaled in said housing, driving connections between the motor and the driveshaft, ways supported in the housing parallel to the driveshaft, a torch supporting assembly positioned on the ways for sliding horizontal movement thereon, a first eccentric keyed to said shaft, an oscillating arm pivoted in the housing and connected between the first eccentric and the torch supporting assembly by means of a rocker arm for reciprocating said assembly on the ways in accordance with the rotation of said first eccentric, means for manually adjusting the throw of the oscillating arm connected to the torch supporting assembly, a torch supporting plunger vertically reciprocable in said torch supporting assembly, a wide face cam keyed to the shaft and positioned to reciprocate the plunger during horizontal reciprocation of the torch supporting assembly, a second eccentric keyed to the shaft, a circular driving member journaled in the housing for moving the entire carriage, means for resiliently urging the driving member against a stationary supporting rail, a one-way clutch connected to said driving member, a connecting link between said second eccentric and said one-way clutch to impart unidirectional movement to the driving member in accordance with the rotation of said second eccentric, and means for manually adjusting the throw of said connecting link.

References Cited in the file of this patent

UNITED STATES PATENTS

| | | |
|---|---|---|
| 1,477,538 | Carter et al. | Dec. 18, 1923 |
| 1,740,033 | Pinckney | Dec. 17, 1929 |
| 1,751,077 | D'Ardenne et al. | Mar. 18, 1930 |
| 1,878,136 | Hasse et al. | Sept. 20, 1932 |
| 2,524,896 | Downing | Oct. 10, 1950 |